S. C. CORNETT & A. D. DAVENPORT.
AUTOMATIC INLET VALVE.
APPLICATION FILED JULY 18, 1911.

1,019,603.

Patented Mar. 5, 1912.

WITNESSES

INVENTORS
Sigurd C. Cornett
Austin D. Davenport
BY
ATTORNEYS

UNITED STATES PATENT OFFICE.

SIGURD CARL CORNETT AND AUSTIN DWIGHT DAVENPORT, OF GUSTINE, CALIFORNIA.

AUTOMATIC INLET-VALVE.

1,019,603. Specification of Letters Patent. Patented Mar. 5, 1912.

Application filed July 18, 1911. Serial No. 639,106.

*To all whom it may concern:*

Be it known that we, SIGURD CARL CORNETT and AUSTIN DWIGHT DAVENPORT, citizens of the United States, and both residents of Gustine, in the county of Merced and State of California, have invented a new and Improved Automatic Inlet - Valve, of which the following is a full, clear, and exact description.

The object of the present invention is to produce a simple and direct acting check valve for controlling the flow of water into a reservoir and to so construct the same that it shall be entirely free of the usual levers and connections between such levers and the operating parts of the valve, and to provide a valve so constructed that the upward movement of the float shall directly and without the intervention of other instrumentalities, close the valve and shut off the flow of water to the reservoir.

Reference is to be had to the accompanying drawings, constituting a part of this specification, in which similar characters of reference denote corresponding parts in all the views and in which—

Figure 1:
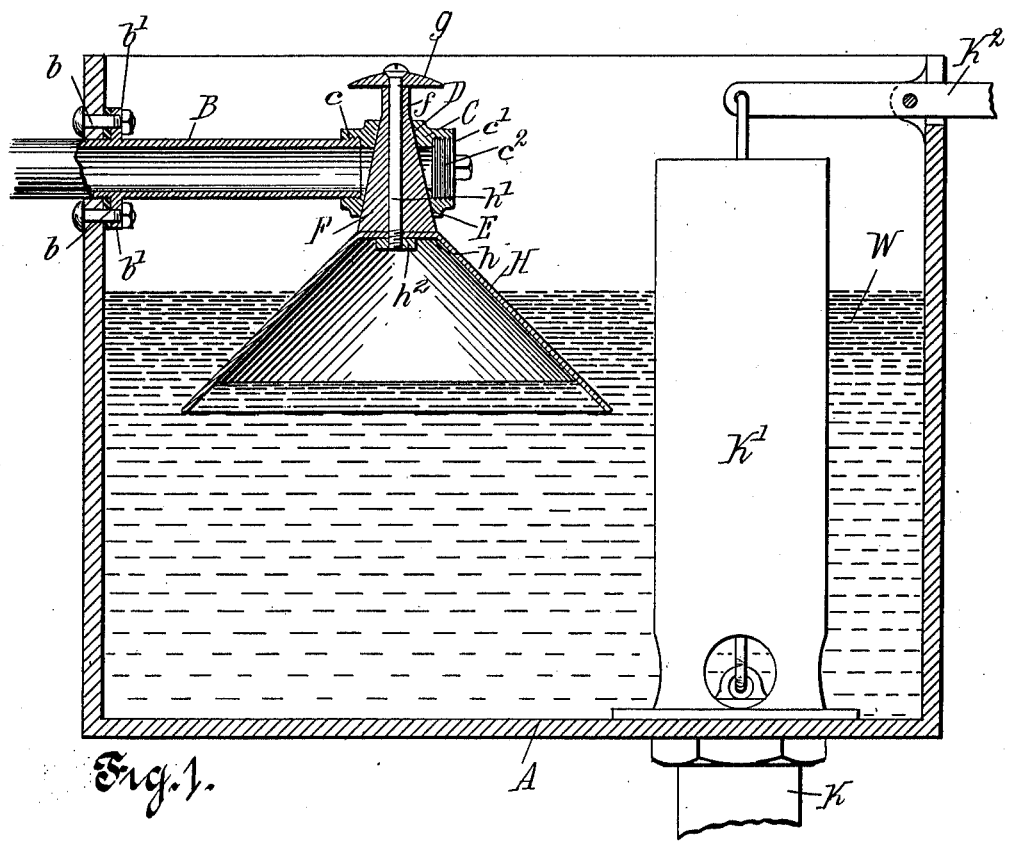
Figure 2:
Figure 3:
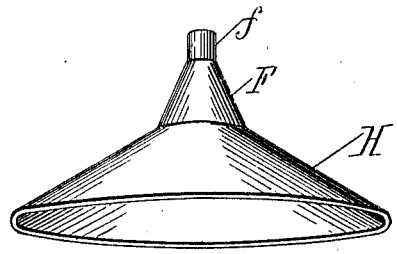

Figure 1 shows a sectional view of a reservoir such as is used for flushing tanks, and showing a vertical section of the improved inlet valve; Fig. 2 shows an end elevation of the inlet pipe; and Fig. 3 shows in perspective the valve and its float removed.

A represents a reservoir or tank which may be of any usual construction, and as shown, consists of a rectangular box open at the top such as is commonly used for flushing tanks. The inlet pipe B enters the tank A at one end near the top, and it consists of a rigid pipe secured in position as by means of the bolts $b$ which pass through one of the end walls of the tank A and through a collar $b'$ formed integrally with the inlet pipe B. At its inner end, the pipe B supports a head block C, which is threaded at $c$, to the end of the inlet pipe B. The inner end of the head block C is provided with an opening $c'$ which receives a threaded block $c^2$, the block closing the end of the head block C and permitting, when removed, access to the valve mechanism and the inlet pipe B, for the purpose of facilitating repairs and cleansing. The head block C is provided with the valve seats D and E having tapered walls and of different diameters, the valve seat E being of greater diameter than the valve seat D, the tapered walls having the same angular position with relation to a vertical line as clearly shown in Fig. 1.

The valve consists of a conical or tapered plug F formed of any suitable metal, the tapered surface being of an angle with relation to a vertical line passing through the center of the plug F, corresponding to that of the inner tapered walls of the valve seats D and E, the plug F being of such a length as to accurately fit and have close contact with both of the valve seats when in an elevated or closed position as shown in Fig. 1 of the drawings, to thus effectually shut off the flowing water from the inlet pipe B to the tank A. Above the tapered surface, the plug F has a substantially reduced cylindrical portion $f$, and is surmounted by a disk or cap $g$ preferably circular in form, and of sufficient diameter so that when the plug F drops to open the valve, such water as may flow out of the opening or port formed by the valve seat D will strike against the under surface of the cap $g$ and be deflected downward into the tank A. The plug F drops by gravity in the opening movement, but it is intended that it shall be automatically lifted by the rising water in the tank A as the water approaches the desired level, and for this purpose the plug F is provided with a depending float H which may be a hollow sealed receptacle of any desired shape but which will preferably be constructed as an open cone, the cone having a flattened apex $h$ fixed to the lower end of the plug F by means of a bolt $h'$ which passes downward through the cap $g$, through the plug $f$ and through an opening in the top $h$ of the cone H, and having at its lower end a nut $h^2$. The open end of the cone is at its under side, and it will be of such diameter as to confine a sufficient body of air to insure that the rising water will bodily raise the cone and its connected plug F with sufficient force to close the inlet pipe B and shut off the inflowing water. The flushing tank A is shown as provided with an outlet pipe K which is controlled by the usual valve K' operated by a lever $K^2$, all of which are of any usual construction and constitute no part of the present invention.

In operation, assuming that the tank A contains a charge of water W, a pull on the lever $K^2$ raises the valve K' and permits the water W to flow from the pipe K. As the water level becomes lower, the float H drops by gravity, permitting the inflow of water from the inlet pipe B, and the water will continue to flow into the tank A so long as the valve K' is held raised. The lowering of the valve K' closes the outlet pipe K, and thereafter the water rises in the tank A until it reaches a point where the air confined in the cone H under the action of the rising water lifts the plug F and brings the conical surface of the plug into close contact with the inclined faces of the valve seats D and E with sufficient force to close the valve and shut off the flow of water. It will be noted that the operation is direct and positive and that the force necessary to close the valve is applied directly adjacent to the valve itself, and is not transmitted thereto through levers or other instrumentalities.

Having thus described our invention, we claim as new and desire to secure by Letters Patent:

1. An inlet valve for tanks and reservoirs, comprising a horizontally arranged inlet pipe, a pair of conical valve seats arranged in vertical alinement with each other and at diametrically opposite points in the inlet pipe, the upper valve seat being of smaller diameter than the lower one, a conical plug of sufficient length to engage both valve seats and arranged for vertical movement with relation thereto, and a float attached to the under side of said conical plug.

2. An inlet valve for tanks and reservoirs, comprising a horizontally arranged inlet pipe, a pair of conical valve seats arranged in vertical alinement with each other and at diametrically opposite points in the inlet pipe, the upper valve seat being of smaller diameter than the lower one, a conical plug of sufficient length to engage both valve seats and arranged for vertical movement with relation thereto, a float attached to the under side of said conical plug, and a deflecting cap attached to the upper end of the conical plug above the upper valve seat.

In testimony whereof we have signed our names to this specification in the presence of two subscribing witnesses.

SIGURD CARL CORNETT.
AUSTIN DWIGHT DAVENPORT.

Witnesses:
R. H. BAMBAUER,
FRANK TWITCHELL.

---

Copies of this patent may be obtained for five cents each, by addressing the "Commissioner of Patents, Washington, D. C."